United States Patent
Shioda et al.

(10) Patent No.: US 10,446,173 B2
(45) Date of Patent: Oct. 15, 2019

(54) APPARATUS, METHOD FOR DETECTING SPEECH PRODUCTION INTERVAL, AND NON-TRANSITORY COMPUTER-READABLE STORAGE MEDIUM FOR STORING SPEECH PRODUCTION INTERVAL DETECTION COMPUTER PROGRAM

(71) Applicant: FUJITSU LIMITED, Kawasaki-shi, Kanagawa (JP)

(72) Inventors: Chisato Shioda, Kawasaki (JP); Nobuyuki Washio, Akashi (JP); Masanao Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/124,288

(22) Filed: Sep. 7, 2018

(65) Prior Publication Data

US 2019/0088272 A1 Mar. 21, 2019

(30) Foreign Application Priority Data

Sep. 15, 2017 (JP) ................................. 2017-178359

(51) Int. Cl.
*G10L 25/84* (2013.01)
*G10L 25/90* (2013.01)
(Continued)

(52) U.S. Cl.
CPC .............. *G10L 25/84* (2013.01); *G10L 15/05* (2013.01); *G10L 15/22* (2013.01); *G10L 25/78* (2013.01);
(Continued)

(58) Field of Classification Search
CPC ......... G10L 25/84; G10L 25/78; G10L 15/22; G10L 15/05; G10L 2025/783; G10L 25/90
(Continued)

(56) References Cited

U.S. PATENT DOCUMENTS 5,018,200 A * 5/1991 Ozawa ................... G10L 19/04
704/222
5,960,386 A * 9/1999 Janiszewski ............ G10L 19/08
704/205
(Continued)

FOREIGN PATENT DOCUMENTS

JP 10-207491 8/1998
JP 11-133997 5/1999
(Continued)

*Primary Examiner* — Edwin S Leland, III
(74) *Attorney, Agent, or Firm* — Fujitsu Patent Center

(57) ABSTRACT

An apparatus for speech processing: calculates a pitch gain indicating a magnitude of periodicity of an audio signal for each frame, the audio signal representing speaker's voice to be divided into the frames each having a predetermined length; determines that a speech production interval has started, when the pitch gain becomes equal or greater than a first threshold after a non-speech production interval; sets a second threshold that is lower than the first threshold by a reduction amount corresponding to a value acquired by subtracting a second representative value of the pitch gain in an interval preceding the start of the speech production interval from a first representative value of the pitch gain in the speech production interval; and determines that the speech production interval has terminated, when the pitch gain becomes smaller than the second threshold after the speech production interval has started.

12 Claims, 11 Drawing Sheets

(51) Int. Cl.
*G10L 15/05* (2013.01)
*G10L 15/22* (2006.01)
*G10L 25/78* (2013.01)

(52) U.S. Cl.
CPC ........ *G10L 25/90* (2013.01); *G10L 2025/783* (2013.01)

(58) Field of Classification Search
USPC .......................................................... 704/233
See application file for complete search history.

(56) References Cited

U.S. PATENT DOCUMENTS

| | | | | |
|---|---|---|---|---|
| 6,202,046 | B1 * | 3/2001 | Oshikiri | G10L 25/78 704/226 |
| 6,275,794 | B1 * | 8/2001 | Benyassine | G10L 25/78 704/207 |
| 2001/0008995 | A1 * | 7/2001 | Kim | G10L 19/12 704/223 |
| 2004/0049380 | A1 * | 3/2004 | Ehara | G10L 19/012 704/219 |
| 2007/0067164 | A1 * | 3/2007 | Goudar | G10L 19/107 704/219 |
| 2009/0138260 | A1 * | 5/2009 | Terao | G10L 15/05 704/219 |
| 2012/0072211 | A1 * | 3/2012 | Edgington | G10L 15/04 704/231 |
| 2013/0185063 | A1 * | 7/2013 | Atti | G10L 17/02 704/219 |
| 2015/0170655 | A1 * | 6/2015 | Li | G10L 19/00 704/500 |
| 2019/0088272 | A1 * | 3/2019 | Shioda | G10L 25/78 |

FOREIGN PATENT DOCUMENTS

| | | |
|---|---|---|
| JP | 2002-236495 | 8/2002 |
| WO | 2007/046267 | 4/2007 |

* cited by examiner

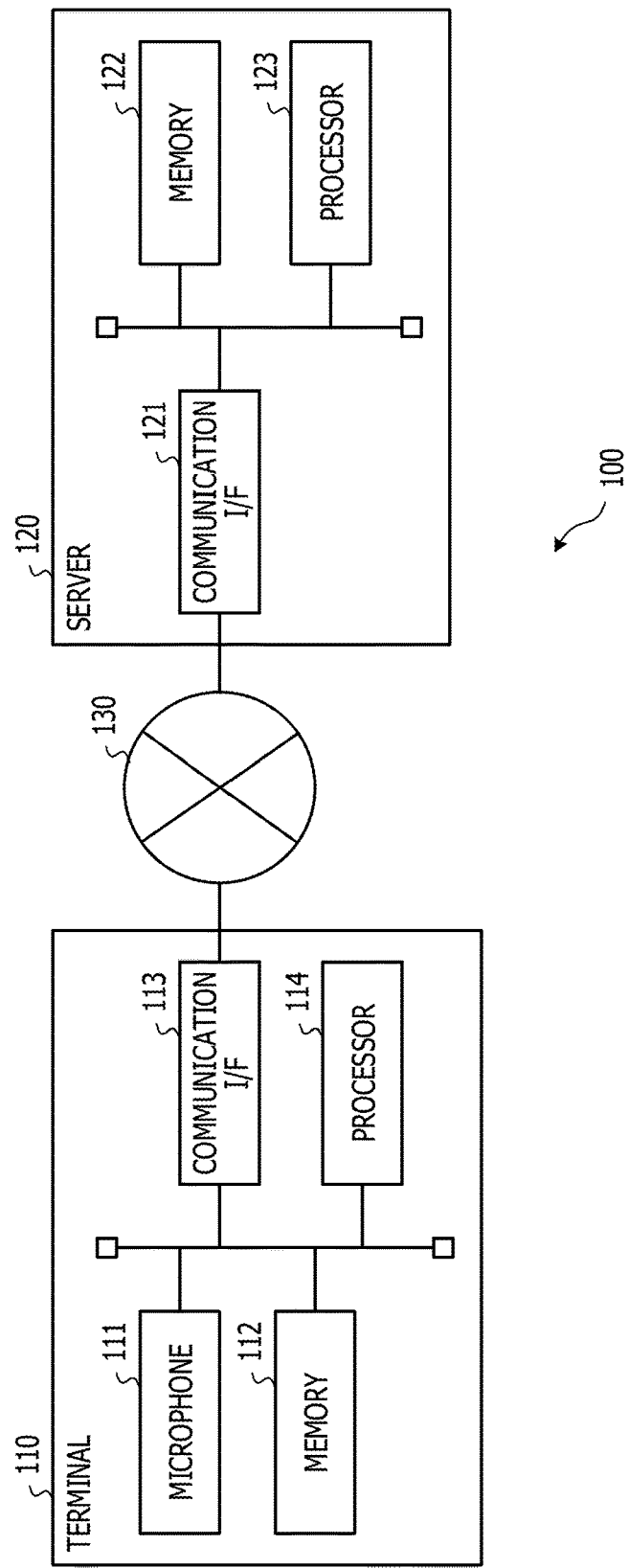

APPARATUS, METHOD FOR DETECTING SPEECH PRODUCTION INTERVAL, AND NON-TRANSITORY COMPUTER-READABLE STORAGE MEDIUM FOR STORING SPEECH PRODUCTION INTERVAL DETECTION COMPUTER PROGRAM

CROSS-REFERENCE TO RELATED APPLICATION

This application is based upon and claims the benefit of priority of the prior Japanese Patent Application No. 2017-178359, filed on Sep. 15, 2017, the entire contents of which are incorporated herein by reference.

FIELD

The embodiment discussed herein is related to an apparatus, a method for detecting speech production interval, and a non-transitory computer-readable storage medium for storing a speech production interval detection computer program, which detect an interval in which a speaker is producing a speech, from audio signals.

BACKGROUND

An application for recognizing a word or phrase produced by a speaker from an audio signal and translating the recognized word or phrase into another language, or searching the recognized word or phrase as a query on a network or a database has been developed. In such application, to identify an interval in which the speaker is producing a speech, for example, the speaker is requested to operate the apparatus that installs with such application therein to instruct start and end of recording of the audio signal. However, in some environments where such application is used, the speaker may not perform the above-mentioned operation. For example, when the speaker is using his/her both hands, the speaker is not able to perform the operation of instructing start and end of recording of the audio signal.

Another technique of determining presence or absence of sound in an audio signal has been proposed. According to this technique, power and a pitch parameter of the input audio signal are calculated for every fixed interval of the audio signal. When a pitch parameter of a second fixed interval following a first sound fixed interval is lower than a predetermined threshold, the second fixed interval is determined as a fixed silence interval.

Examples of the related art include Japanese Laid-open Patent Publication No. 11-133997.

SUMMARY

According to an aspect of the invention, an apparatus for detecting speech production interval includes a memory and a processor coupled to the memory and configured to: execute pitch gain calculation processing that includes calculating a pitch gain indicating a magnitude of periodicity of an audio signal for each frame, the audio signal representing speaker's voice to be divided into the frames each having a predetermined length; execute speech production interval start detection processing that includes determining that a speech production interval in which the speaker produces a speech has started, when the pitch gain becomes equal or greater than a first threshold after a non-speech production interval in which the speaker is not producing a speech; execute threshold setting processing that includes setting a second threshold that is lower than the first threshold by a reduction amount corresponding to a value acquired by subtracting a second representative value of the pitch gain in an interval preceding the start of the speech production interval from a first representative value of the pitch gain in the speech production interval; and execute speech production interval end detection processing that includes determining that the speech production interval has terminated, when the pitch gain becomes smaller than the second threshold after the speech production interval has started.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a view illustrating an example of relationship between a pitch gain difference value and a threshold reduction amount adjusting coefficient a;

FIG. 11 is a schematic configuration view of a server client system equipped with the speech production interval detection apparatus in any of the embodiment and the modification examples.

DESCRIPTION OF EMBODIMENT

Figure 1:
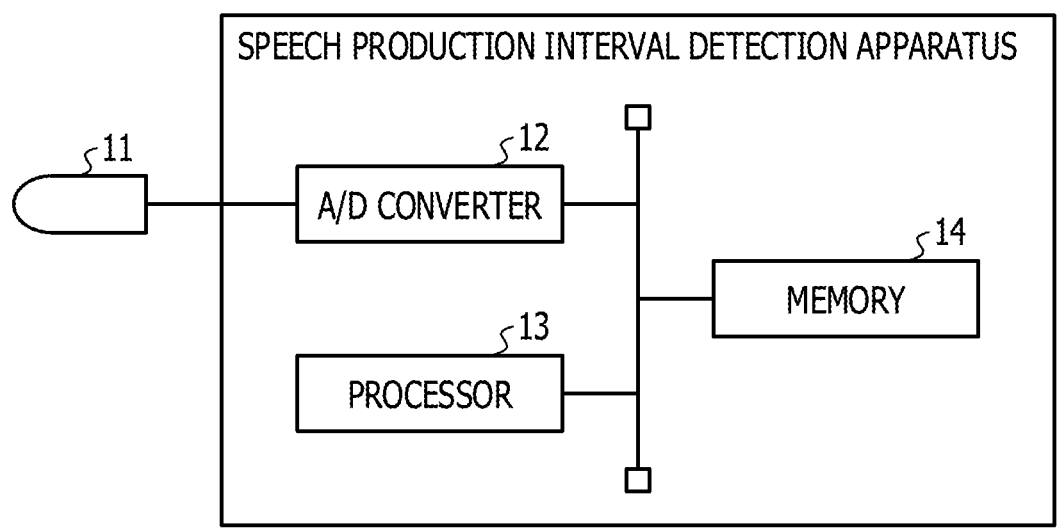
FIG. 1 is a schematic configuration view illustrating a speech production interval detection apparatus according to an embodiment.

However, in some environments surrounding the speaker, the pitch parameter of the input audio signal may be affected by sound other than speaker's voice. For this reason, according to the above-mentioned technique of determining whether or not sound is present based on comparison of the pitch parameter with a fixed threshold, the end of the interval in which the speaker is producing a speech may not be detected in the audio signal.

According to one aspect, an object of the present disclosure is to provide a speech production interval detection apparatus capable of properly detecting the end of the interval in which the speaker is producing a speech in the audio signal.

A speech production interval detection apparatus according to an embodiment will be described below with reference to figures.

In terms of characteristics of human voice, a certain level of periodicity is found in an interval in which the speaker is producing a speech in an audio signal (hereinafter referred to as merely speech production interval). Thus, the speech production interval detection apparatus detects the speech production interval, based on a pitch gain representing the magnitude of sound periodicity. Therefore, the speech production interval detection apparatus is able to detect the speech production interval more correctly as compared with the use of power or a signal to noise ratio that is able to take a large value from any sound other than the speaker's voice.

Here, it is known that, when the speaker is continuously speaking, the expiratory pressure of the speaker decreases toward the end of a word, the periodicity in the glottal stop weakens (Refer to, for example, Yukio Kamimura, "Expiratory Flow/Expiratory Pressure And Articulatory Phonetics", Cultural Sciences 6, pp. 247-291, 2007). Based on this fact, the Inventor notes that the pitch gain attenuates toward the end of the word in the speech production interval. In the speech production interval detection apparatus, a second threshold of the pitch gain, which is used to detect the end of the speech production interval, is set lower than a first threshold of the pitch gain, which is used to detect the start of the speech production interval.

However, for example, when another speaking person is present around the speaker, the pitch gain in the audio signal may be affected by the environment around the speaker. In such case, even after the speaker finishes speaking, the pitch gain of the audio signal has a certain degree of magnitude. For this reason, when the second threshold is set to be excessively low, it becomes difficult to correctly detect the end of the speech production interval. For example, when an apparatus for recognizing speaker's voice in the speech production interval fails to detect the end of the speech production interval, sound recognition continues even after the end of the speech production interval. This disadvantageously extends a response time from the end of speaker's speech to response of the apparatus.

Thus, the speech production interval detection apparatus decreases a difference between the first threshold and the second threshold, as a difference between a representative value of the pitch gain in the speech production interval and a representative value of the pitch gain in the interval immediately preceding the speech production interval is smaller.

The speech production interval detection apparatus is able to be implemented in various apparatuses using a user interface utilizing sound recognition, such as a navigation system, a mobile phone, and a computer.

FIG. 1 is a schematic configuration view illustrating a speech production interval detection apparatus according to an embodiment. A speech production interval detection apparatus 1 includes a microphone 11, an analog/digital converter 12, a processor 13, and a memory 14. The speech production interval detection apparatus 1 may further include a speaker (not illustrated), a display (not illustrated), and a communication interface (not illustrated) for communication with other equipment.

The microphone 11 is an example of a sound input section. The section collects sound surrounding the speech production interval detection apparatus 1, which includes speaker's voice, and generates an analog audio signal corresponding to the strength of the sound. The microphone 11 outputs the analog audio signal to the analog/digital converter 12 (hereinafter referred to as A/D converter). The A/D converter 12 samples an analog audio signal at a predetermined sampling rate, thereby digitizing the audio signal. The sampling rate is set to, for example, 16 to 32 kHz, such that the frequency band requested to analyze speaker's voice from the audio signal is equal to or smaller than the Nyquist frequency. The A/D converter 12 outputs the digitized audio signal to the processor 13. Hereinafter, the digitized audio signal is referred to as merely audio signal.

The processor 13 includes, for example, a central processing unit (CPU), a read/write memory circuit, and a peripheral circuit. The processor 13 may further include a numerical value calculation circuit. The processor 13 applies speech production interval detection processing to the audio signal, to detect the speech production interval. The processor 13 applies sound recognition processing to the audio signal in the speech production interval, to recognize a word or phrase issued by the speaker. Further, the processor 13 executes the processing corresponding to the recognized word or phrase, for example, translates the recognized word or phrase into a word or phrase in predefined language, or searches the recognized word or phrase as a query on the network. Details of the speech production interval detection processing will be described later.

The memory 14 includes, for example, a read/write non-volatile semiconductor memory and a read/write volatile semiconductor memory. Further, the memory 14 may include a magnetic recording medium or an optic recording medium, and an access device thereto. The memory 14 stores various data used for the speech production interval detection processing executed in the processor 13, and various data generated during the speech production interval detection processing. For example, the memory 14 stores a threshold for the pitch gain. Further, the memory 14 may store a program on the processing applied to the audio signal in the speech production interval, and various data used in the program.

Details of the processor 13 will be described below.

Figure 2:
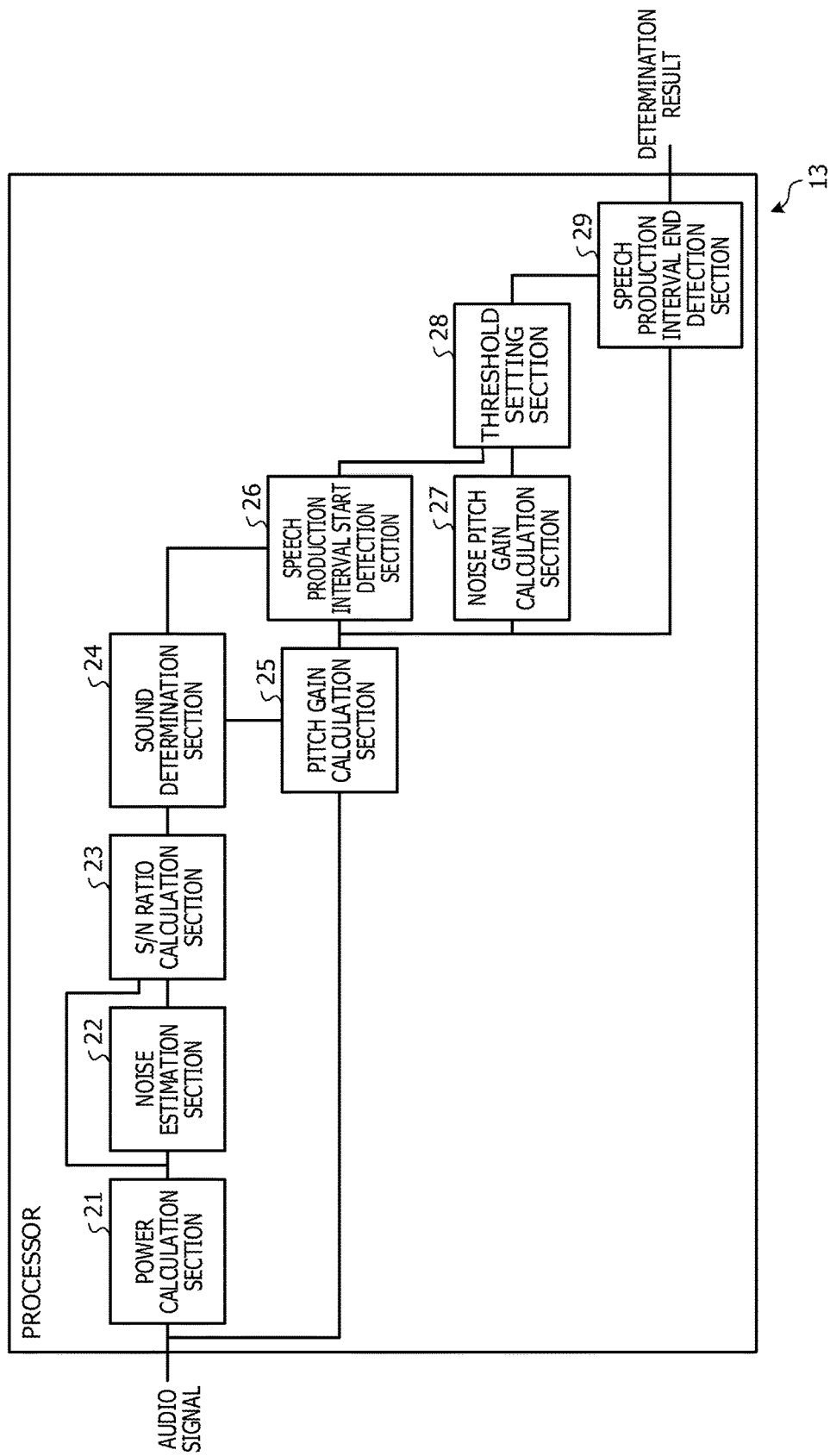
FIG. 2 is a functional block diagram of a processor that executes speech production interval detection processing.

FIG. 2 is a functional block diagram of the processor 13 that executes the speech production interval detection processing. The processor 13 includes a power calculation section 21, a noise estimation section 22, an S/N ratio calculation section 23, a sound determination section 24, a pitch gain calculation section 25, a speech production interval start detection section 26, a noise pitch gain calculation section 27, a threshold setting section 28, and a speech production interval end detection section 29.

These sections of the processor 13 are functional modules realized by a computer program that runs on the processor 13. Alternatively, these sections of the processor 13 may be incorporated into the processor 13, as dedicated circuits.

The processor 13 executes the speech production interval detection processing using a frame having a predetermined length in the audio signal, as a processing unit. The length of the frame is set to, for example, 10 to 20 msec. Thus, the processor 13 divides the audio signal into frames, and inputs each frame to the power calculation section 21 and the pitch gain calculation section 25.

Each time the frame is inputted, the power calculation section 21 calculates power of the audio signal for the frame. The power calculation section 21 calculates power for each frame by a following equation.

$$Spow(k) = \sum_{n=0}^{N-1} s_k(n)^2 \qquad (1)$$

Wherein, $S_k(n)$ represents a signal value at an n-th sampling point in the newest frame (also referred to as current frame). k represents frame number. N represents the total number of sampling points included in one frame. Spow(k) represents power in the current frame.

The power calculation section 21 may calculate power for each of a plurality of frequencies in each frame. In this case, using time-frequency conversion, the power calculation section 21 converts the audio signal in each frame into a spectrum signal from a time domain to a frequency domain. For example, the power calculation section 21 is able to use fast fourier transform (FFT) as time-frequency conversion. The power calculation section 21 is able to calculate a sum of squares of the spectrum signal included in each frequency band, as power of the frequency band.

The power calculation section 21 outputs power in each frame to the noise estimation section 22 and the S/N ratio calculation section 23.

For each frame, the noise estimation section 22 calculates an estimated noise component in the audio signal in the frame. In this embodiment, the noise estimation section 22 updates the estimated noise component in the immediately preceding frame by a following equation using power in the current frame, thereby calculating the estimated noise component in the current frame.

$$\text{Noise}(k) = \beta \cdot \text{Noise}(k-1) + (1-\beta) \cdot \text{Spow}(k) \quad (2)$$

Wherein, Noise(k-1) represents the estimated noise component in the immediately preceding frame, and Noise(k) represents the estimated noise component in the current frame. $\beta$ is a forgetting coefficient, and is set to, for example, 0.9.

In the case where power is calculated for each frequency band, the noise estimation section 22 may calculate the estimated noise component for each frequency band by the equation (2). In this case, in the equation (2), Noise(k-1), Noise(k), and Spow(k) are the estimated noise component in the immediately preceding frame, the estimated noise component in the current frame, and power for the concerned frequency band, respectively.

The noise estimation section 22 outputs the estimated noise component in each frame to the S/N ratio calculation section 23.

When the below-mentioned sound determination section 24 determines that the current frame is a sound frame containing any signal component, the noise estimation section 22 may replace the estimated noise component Noise(k) in the current frame with Noise(k-1). As a result, the noise estimation section 22 is able to estimate the noise component based on the frame that does not contain the signal component but contain only the noise component, thereby improving the accuracy of estimating the noise component.

Alternatively, only when power in the current frame is equal to or smaller than a predetermined threshold, the noise estimation section 22 may update the estimated noise component by the equation (2). When power in the current frame is larger than the predetermined threshold, the noise estimation section 22 may set Noise(k) to Noise(k-1). The predetermined threshold may be, for example, a value acquired by adding a predetermined offset value to Noise(k-1).

The S/N ratio calculation section 23 calculates a signal to noise ratio (hereinafter referred to as merely SN ratio) for each frame. For example, the S/N ratio calculation section 23 calculates the SN ratio by a following equation.

$$SNR(k) = 10 \cdot \log_{10} \frac{Spow(k)}{Noise(k)} \quad (3)$$

Wherein, SNR(k) represents the SN ratio in the current frame. In the case where power and the estimated noise component are calculated for each frequency band, the S/N ratio calculation section 23 may calculate the SN ratio for each frequency band by the equation (3). In this case, in the equation (3), Noise(k), Spow(k), and SNR(k) are the estimated noise component, power, and the SN ratio in the current frame for the concerned frequency band, respectively.

The S/N ratio calculation section 23 outputs the SN ratio for each frame to the sound determination section 24.

For each frame, the sound determination section 24 determines whether or not the frame is included in a sound interval, based on the SN ratio for the frame. The sound interval is an interval in which the audio signal is estimated to contain any signal component. For this reason, the speech production interval is assumed to be included in the sound interval. Thus, by identifying the sound interval as an interval to be detected as the speech production interval, the speech production interval detection apparatus 1 is able to improve the accuracy of detecting the speech production interval.

In this embodiment, for each frame, the sound determination section 24 compares the SN ratio in each frame with a sound determination threshold Thsnr. The sound determination threshold Thsnr is set to a value indicating that the audio signal contains any signal component other than the estimated noise component, for example, 2 to 3. When the SN ratio is equal or greater than the sound determination threshold Thsnr, the sound determination section 24 determines that the frame is included in the sound interval. On the contrary, when the SN ratio is smaller than the sound determination threshold Thsnr, the sound determination section 24 determines that the frame is not included in the sound interval, that is, is included in a silence interval. When a frame in which the SN ratio is equal or greater than the sound determination threshold Thsnr continues for a fixed period (for example, 1 second), the sound determination section 24 may determine that the sound interval has started. In the state where the preceding frame is determined to be included in the sound interval, when a frame in which the SN ratio is smaller than the sound determination threshold Thsnr continues for a fixed period, the sound determination section 24 may determine that the sound interval has terminated.

Further, in the case where the SN ratio is calculated for each frequency band, when the number of frequency bands in which the SN ratio is equal or greater than the sound determination threshold Thsnr becomes equal or greater than a predetermined number, the sound determination section 24 may determine that the frame is included in the sound interval. The predetermined number may be set to, for example, ½ of the total number of frequency bands for which the SN ratio is calculated. Alternatively, for the frequency band including the frequency to be analyzed, when the SN ratio is equal or greater than the sound determination threshold Thsnr, the sound determination section 24 may determine that the frame is included in the sound interval.

Alternatively, the sound determination section 24 may determine whether or not each frame is included in the sound interval, based on power itself in the frame. In this case, the sound determination section 24 may determine that the current frame is included in the sound interval when power in the current frame is equal or greater than a predetermined threshold, and determine that the current frame is included in the silence interval when power in the current frame is smaller than the predetermined threshold. In this case, the predetermined threshold may be set to be larger as the estimated noise component in the current frame becomes larger.

The sound determination section 24 notifies information on a determination result representing whether or not each frame is included in the sound interval, to the noise estimation section 22 and the pitch gain calculation section 25. For example, the information on the determination result representing whether or not each frame is included in the sound interval may be a flag that becomes "1" in the sound interval, and becomes "0" in the silence interval.

After the speech production interval start detection section 26 detects the start of the speech production interval, and before the speech production interval end detection section 29 detects the end of the speech production interval, the sound determination section 24 could determine that the current frame belongs to the silence interval. In this case, the sound determination section 24 may determine that the speech production interval has terminated in the immediately preceding frame.

The pitch gain calculation section 25 calculates a pitch gain representing the strength of the sound periodicity in each frame. The pitch gain is also referred to as pitch prediction gain. Since the pitch gain calculation section 25 executes the same processing for frames included in the sound interval, processing for one frame will be described below.

To calculate the pitch gain, first, the pitch gain calculation section 25 calculates a long-term autocorrelation C(d) of the audio signal for a delay amount $d \in \{d_{low}, \ldots, d_{high}\}$.

$$C(d) = \sum_{n=0}^{N-1} s_k(n) \cdot s_k(n-d) \quad (d = d_{low}, \ldots, d_{high}) \quad (4)$$

As described above, $S_k(n)$ is an n-th signal value in a current frame k. N represents the total number of sampling points included in a frame. When (n−d) is negative, a corresponding signal value (that is, $S_{k-1}(N-(n-d))$) in the immediately preceding frame is used as $S_k(n-d)$. A range of the delay amount d $\{d_{low}, \ldots, d_{high}\}$ is set to include a delay amount corresponding to a fundamental frequency of human voice (100 to 300 Hz). The reason why the range includes the delay amount is that the pitch gain reaches a peak at the fundamental frequency. For example, when the sampling rate is 16 kHz, $d_{low}$ is set to 40, and $d_{high}$ is set to 286.

When calculating the long-term autocorrelation C(d) for each delay amount d in the delay amount range, the pitch gain calculation section 25 finds a maximum value $C(d_{max})$ of the long-term autocorrelation C(d). $d_{max}$ represents a delay amount corresponding to the maximum value $C(d_{max})$ of the long-term autocorrelation C(d), and the delay amount corresponds to a pitch cycle. The pitch gain calculation section 25 calculates a pitch gain $g_{pitch}$ by a following equation.

$$g_{pitch} = \frac{C(d_{max})}{\sum_{n=0}^{N-1} s_k(n) \cdot s_k(n)} \quad (5)$$

Each time the pitch gain calculation section 25 calculates the pitch gain $g_{pitch}$ of the frame, the pitch gain calculation section 25 outputs the pitch gain $g_{pitch}$ to the speech production interval start detection section 26, the noise pitch gain calculation section 27, the threshold setting section 28, and the speech production interval end detection section 29.

For each frame in the sound interval, the speech production interval start detection section 26 compares the pitch gain $g_{pitch}$ with a first threshold for detecting the start of the speech production interval, to detect the start of the speech production interval. That is, in the case where a non-speech production interval in which the speaker is not producing a speech continues, when the pitch gain $g_{pitch}$ becomes equal or greater than the first threshold, the speech production interval start detection section 26 determines that the speech production interval in which the speaker is producing a speech has started.

In this embodiment, when the frame immediately preceding the current frame is not included in the speech production interval, the speech production interval start detection section 26 compares the relatively high first threshold for detecting the start of the speech production interval with the pitch gain. Whether or not the immediately preceding frame is included in the speech production interval is determined, for example, by referring to the flag indicating whether the frame is included in the speech production interval or non-speech production interval, which is stored in the memory 14. When the pitch gain is equal or greater than the first threshold, the speech production interval start detection section 26 determines that the speech production interval has started from the current frame. The speech production interval start detection section 26 updates the flag indicating whether the frame is included in the speech production interval or non-speech production interval, to a value representing the speech production interval (for example, '1'). Further, the speech production interval start detection section 26 notifies the processor 13 and the noise pitch gain calculation section 27 that the speech production interval has started.

The noise pitch gain calculation section 27 calculates the representative value of the pitch gain in the interval including a plurality of frames immediately preceding the start of the speech production interval, that is, the representative value of the noise pitch gain. In this embodiment, the noise pitch gain calculation section 27 calculates an average value of the noise pitch gain as the representative value of the noise pitch gain. In intervals other than the speech production interval, it is estimated that the pitch gain varies relatively randomly. Thus, by defining the average value of the pitch gain in the interval immediately preceding the speech production interval as the representative value of the noise pitch gain, the noise pitch gain calculation section 27 is able to correctly evaluate the level of the pitch gain in the environment surrounding the speaker.

For example, the noise pitch gain calculation section 27 updates the average value of the noise pitch gain, for example, by a following equation, until the speech production interval start detection section 26 notifies that the speech production interval has started.

$$g_{noisep}(k) = \alpha \cdot g_{noisep}(k-1) + (1-\alpha) \cdot g_{pitch}(k) \quad (6)$$

Wherein, $g_{noisep}(k)$ represents the average value of the noise pitch gain in the interval having the newest frame as a terminal end, and $g_{noisep}(k-1)$ represents the average value of the noise pitch gain in the interval having the immediately preceding frame as a terminal end. $g_{pitch}(k)$ represents the pitch gain in the newest frame. α represents a forgetting coefficient, and is set to, for example, 0.9. When the newest frame is a first frame in the speech production interval, the noise pitch gain calculation section 27 does not update the average value of the noise pitch gain, but notifies average value $g_{noisep}(k-1)$ of the noise pitch gain calculated on the immediately preceding frame to the threshold setting section 28.

In a modification example, each time the noise pitch gain calculation section 27 receives the pitch gain $g_{pitch}$ of the frame from the pitch gain calculation section 25, the noise pitch gain calculation section 27 stores the pitch gain $g_{pitch}$ in the memory 14. When receiving the notification that the speech production interval has started from the speech production interval start detection section 26, the noise pitch gain calculation section 27 reads the pitch gain $g_{pitch}$ of each frame from the memory 14. Then, the noise pitch gain calculation section 27 may calculate an average value a $g_{noisep}(k-1)$ of the noise pitch gain immediately preceding the start of the speech production interval by a following equation.

$$g_{noisep}(k-1) = \frac{1}{M} \sum_{i=0}^{M-1} g_{pitch}(k-M+i) \qquad (7)$$

Wherein, M represents the number of frames included in the interval in which the average value of the noise pitch gain is calculated, and is set to two or more, for example, 5 to 10. $g_{pitch}(k-M+i)$ represents the pitch gain in each frame included in the interval in which the average value of the noise pitch gain is calculated. In particular, $g_{pitch}(k-1)$ represents the pitch gain in the immediately preceding frame in which the speech production interval starts. Also in this modification example, the noise pitch gain calculation section 27 notifies the average value $g_{noisep}(k-1)$ of the noise pitch gain to the threshold setting section 28.

The threshold setting section 28 sets a reduction amount of the second threshold for detecting the end of the speech production interval from the first threshold, based on a difference between the representative value of the pitch gain in the speech production interval and the representative value of the noise pitch gain in the interval immediately preceding the start of the speech production interval.

For example, after the start of the speech production interval, the threshold setting section 28 calculates a maximum value of the pitch gain in each frame preceding the current frame, as the representative value of the pitch gain in the speech production interval. In the speech production interval, the maximum value of the pitch gain substantially depends on speaker's voice. For this reason, by defining the maximum value of the pitch gain in the speech production interval as the representative value of the pitch gain in the speech production interval, the threshold setting section 28 is able to correctly evaluate the level of the pitch gain caused by speaker's voice. To set the reduction amount of the threshold, the threshold setting section 28 calculates a difference value acquired by subtracting the representative value of the noise pitch gain in the interval immediately preceding the start of the speech production interval from the representative value of the pitch gain in the speech production interval (hereinafter referred to as a pitch gain difference value). As in this embodiment, by setting the reduction amount of the threshold based on the difference value between the maximum value of the pitch gain in the speech production interval and the average value of the noise pitch gain in the interval immediately preceding the start of the speech production interval, the threshold setting section 28 is able to set the second threshold to a proper value.

As described above, while the speaker continuously produces a speech, the pitch gain attenuates toward the end of the word. For this reason, it is assumed that the pitch gain becomes a peak in a first few frames in the speech production interval. Thus, the threshold setting section 28 may define the maximum value of the pitch gain in a few frame after the speech production interval start detection section 26 notifies the start of the speech production interval, as the maximum value of the pitch gain in the speech production interval.

As the pitch gain difference value is larger, the threshold setting section 28 sets the reduction amount of the second threshold, which is used to detect the end of the speech production interval, larger than the first threshold used to detect the start of the speech production interval. That is, as the pitch gain difference value is larger, the threshold setting section 28 decreases the second threshold. Thereby, in the relatively quiet environment around the speaker, the speech production interval end detection section 29 is able to be suppressed from wrongly detecting the end of the speech production interval while the speaker is producing a speech. On the contrary, since the difference between the first threshold and the second threshold is small while another person speaks around the speaker, the speech production interval end detection section 29 is able to be suppressed from failing to detect the end of the speech production interval.

For example, the threshold setting section 28 sets a second threshold Th2 by a following equation.

$$Th2 = Th1 - a \cdot D \qquad (8)$$

Here, Th1 represents the first threshold, and D represents a standard value of preset threshold reduction amount, and is set to, for example, 0.2 to 0.3. The coefficient a is a coefficient corresponding to the pitch gain difference value, and becomes larger as the pitch gain difference value is larger.

Figure 3:
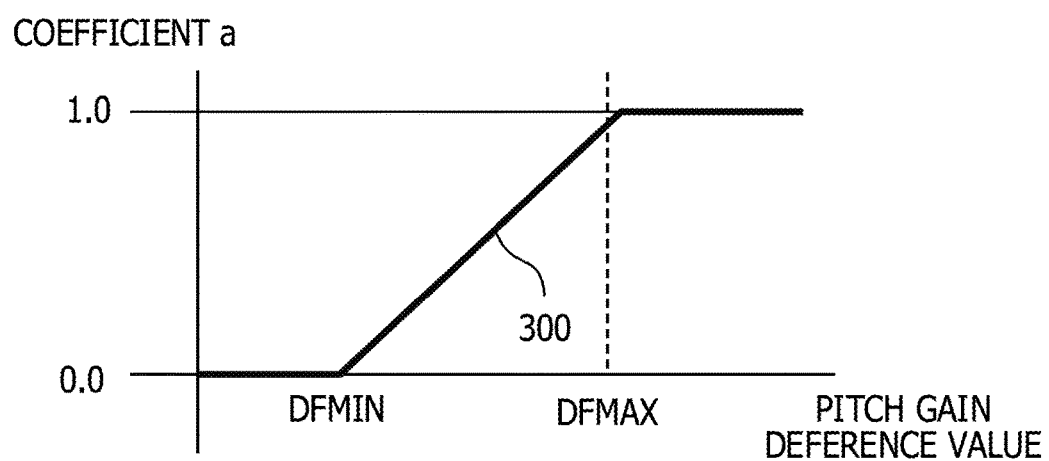

FIG. 3 is a view illustrating an example of relationship between the pitch gain difference value and the coefficient a. In FIG. 3, a horizontal axis represents pitch gain difference value, and a vertical axis represents the coefficient a. A graph 300 illustrates relationship between the pitch gain difference value and the coefficient a. As illustrated in FIG. 3, when the pitch gain difference value is equal to or smaller than a lower limit reference value DFMIN (for example, DFMIN=0.1 to 0.2), the coefficient a is set to 0. That is, when the pitch gain difference value is equal to or smaller than the lower limit reference value DFMIN, the second threshold Th2 is equal to the first threshold Th1. On the contrary, when the pitch gain difference value is equal to or larger than an upper limit reference value DFMAX (for example, DFMAX=0.5 to 0.6), the coefficient a is set to 1. That is, when the pitch gain difference value is equal or greater than the upper limit reference value DFMAX, the second threshold Th2 becomes (Th1-D). When the pitch gain difference value is greater than the lower limit reference value DFMIN and is smaller than the upper limit reference value DFMAX, the coefficient a increases monotonously and linearly as the pitch gain difference value is larger. Accordingly, when the pitch gain difference value is larger than the lower limit reference value DFMIN, and is smaller than the upper limit reference value DFMAX, the second threshold Th2 becomes smaller as the pitch gain difference value is larger.

In a modification example, the threshold reduction amount D may be set such that the threshold reduction amount D becomes larger as the pitch gain difference value is larger. In this case, in the equation (8), the coefficient a may be set to 1.0.

Figure 4:
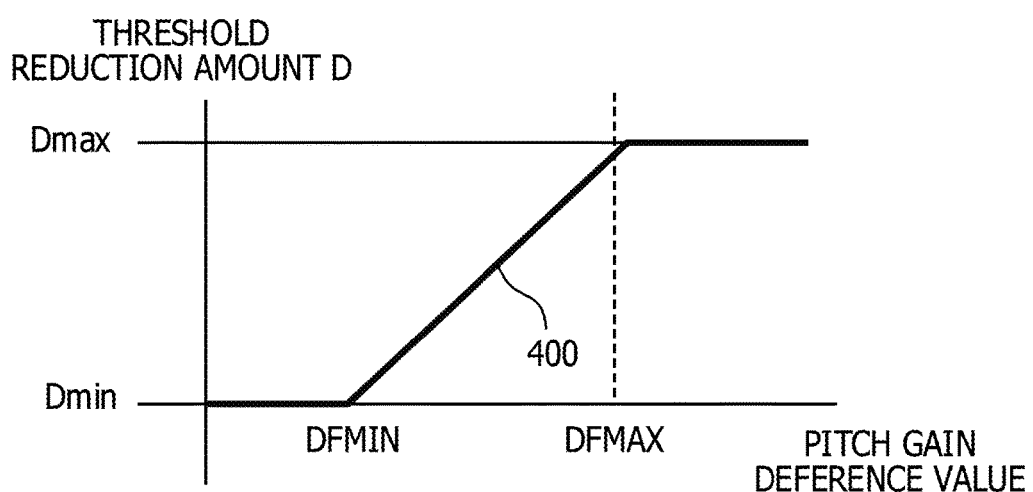
FIG. 4 is a view illustrating an example of relationship between the pitch gain difference value and the threshold reduction amount in a modification example.

FIG. 4 is a view illustrating an example of relationship between the pitch gain difference value and the threshold reduction amount D in this modification example. In FIG. 4, a horizontal axis represents pitch gain difference value, and a vertical axis represents threshold reduction amount D. A graph 400 illustrates relationship between the pitch gain difference value and the coefficient a. As illustrated in FIG. 4, when the pitch gain difference value is equal to or smaller than the lower limit reference value DFMIN, the threshold reduction amount D is set to a minimum value Dmin of the threshold reduction amount (for example, Dmin=0 to 0.1). That is, when the pitch gain difference value is equal to or smaller than the lower limit reference value DFMIN, the second threshold Th2 becomes (Th1−Dmin). On the contrary, when the pitch gain difference value is equal or greater than the upper limit reference value DFMAX, the threshold reduction amount D is set to a maximum value Dmax of the threshold reduction amount (for example, Dmax=0.2 to 0.3). That is, when the pitch gain difference value is equal or greater than the upper limit reference value DFMAX, the second threshold Th2 becomes (Th1−Dmax). When the pitch gain difference value is larger than the lower limit reference value DFMIN and is smaller than the upper limit reference value DFMAX, the threshold reduction amount D increases monotonously and linearly as the pitch gain difference value is larger. Accordingly, when the pitch gain difference value is larger than the lower limit reference value DFMIN, and is smaller than the upper limit reference value DFMAX, the second threshold Th2 becomes smaller as the pitch gain difference value is larger.

Each time the maximum value of the pitch gain in the speech production interval is updated, the threshold setting section 28 may calculate the second threshold Th2. Each time the second threshold Th2 is calculated, the threshold setting section 28 notifies the second threshold Th2 to the speech production interval end detection section 29.

In the case where the speech production interval continues, when the pitch gain becomes less than the second threshold that is smaller than the first threshold, the speech production interval end detection section 29 determines that the speech production interval has terminated. That is, when the frame immediately preceding the current frame is included in the speech production interval, the speech production interval end detection section 29 compares the pitch gain in the current frame with the second threshold. When the pitch gain in the current frame is smaller than the second threshold, the speech production interval end detection section 29 determines that the speech production interval has terminated in the immediately preceding frame. The speech production interval end detection section 29 updates the flag indicating whether the frame is included in the speech production interval or non-speech production interval, to a value representing the non-speech production interval (for example, '0').

Figure 5:
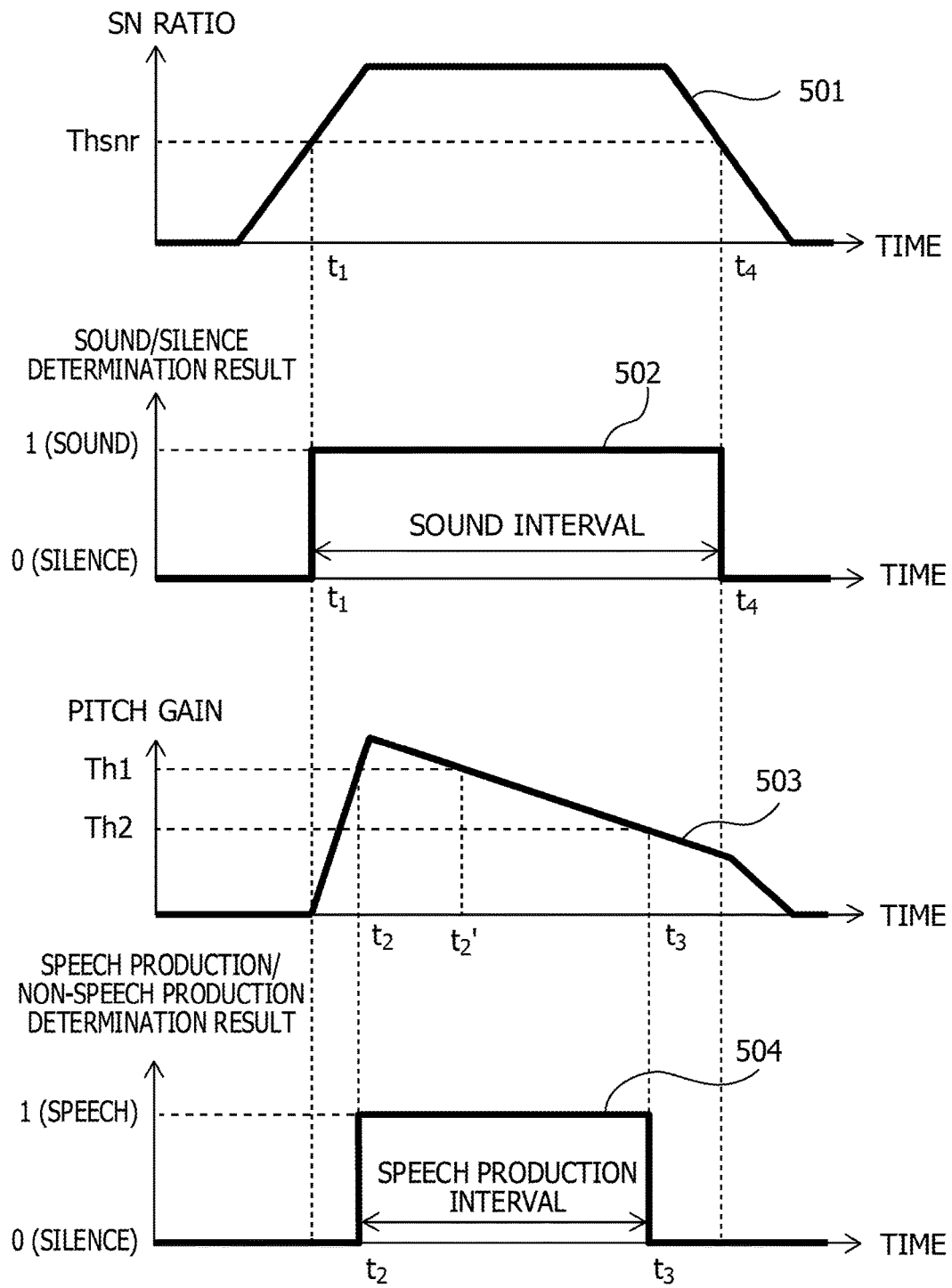
FIG. 5 is a view for describing summary of the speech production interval detection processing.

FIG. 5 is a view for describing summary of the speech production interval detection processing in this embodiment. In each graph in FIG. 5, a horizontal axis represents time. In the topmost graph, a vertical axis represents the SN ratio. In the second graph from the top, a vertical axis represents a determination result indicating the frame is included in the sound interval or the silence interval. In the third graph from the top, a vertical axis represents pitch gain. In the lowermost graph, a vertical axis represents a determination result indicating whether the frame is included in the speech production interval or non-speech production interval.

In the topmost graph, a waveform 501 represents a change of the SN ratio with time. In the second graph from the top, a waveform 502 represents a determination result indicating the interval is the sound interval or the silence interval at each time. As represented by the waveform 501, a time t1, the SN ratio become equal or greater than the sound determination threshold Thsnr, and then, up to a time t4, the SN ratio is equal or greater than the sound determination threshold Thsnr. Following the time t4, the SN ratio becomes smaller than the sound determination threshold Thsnr. As a result, as represented by the waveform 502, the interval from the time t1 to the time t4 is determined as the sound interval, and intervals preceding and following the sound interval are determined as the silence interval.

In the third graph from the bottom, a waveform 503 represents a change of the pitch gain with time. In the lowermost graph, a waveform 504 represents a determination result indicating whether the interval is the speech production interval or non-speech production interval at each time. As expressed by the waveform 503, the pitch gain starts to rise from the time t1, and at a time t2, becomes equal or greater than the first threshold Th1. After a while, the pitch gain becomes a peak and then, gradually attenuates. At a time t3, the pitch gain becomes smaller than the second threshold Th2 that is lower than the first threshold Th1. As a result, as represented by the waveform 504, an interval from the time t2 to the time t3 is determined as the speech production interval. If the threshold Th1 is used to determine the end of the speech production interval, since the pitch gain becomes smaller than the threshold Th1 at a time t2', only an interval that is shorter than the original speech production interval is detected as the speech production interval. However, as described above, by making the threshold Th2 used to determine the end of the speech production interval lower than the threshold Th1 used to determine the start of the speech production interval, the speech production interval is able to be properly detected.

Figure 6:
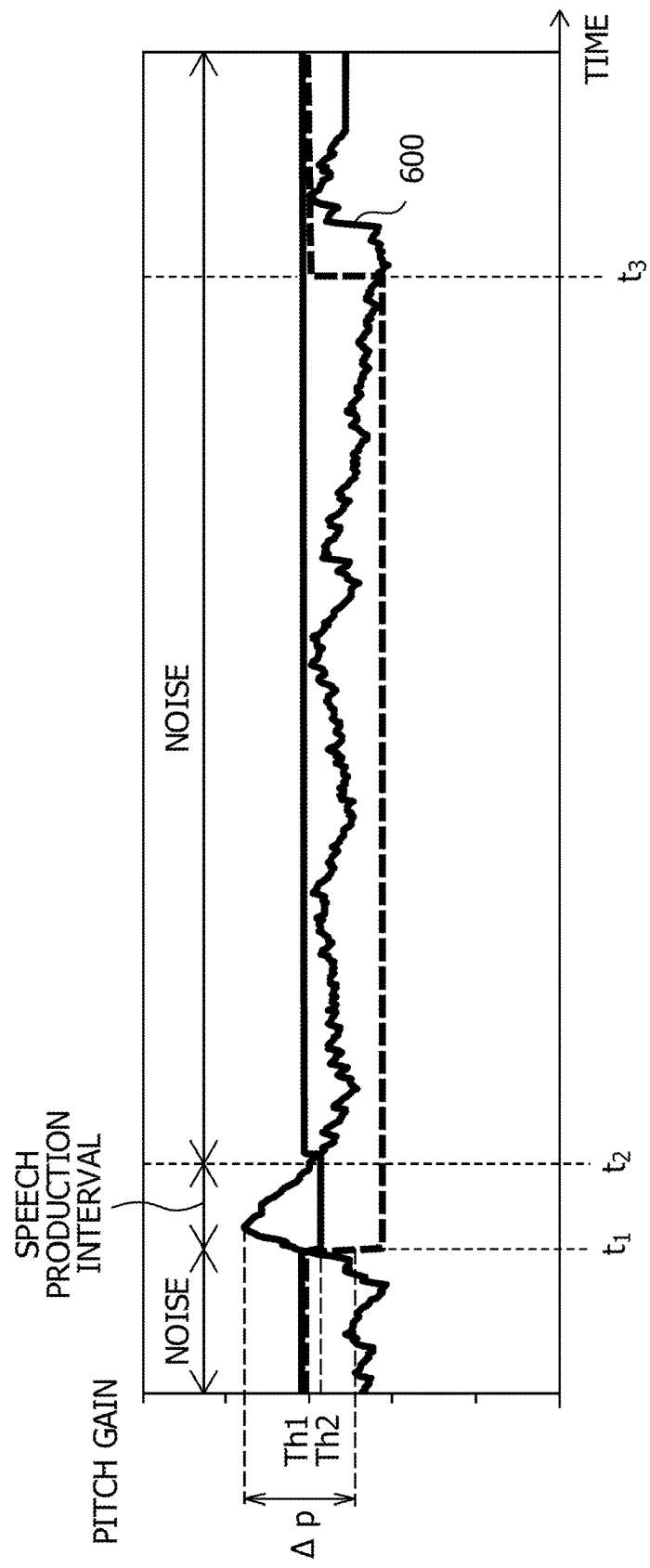
FIG. 6 is a view illustrating an example of relationship between a second threshold set based on the pitch gain difference value and a speech production interval.

FIG. 6 is a view illustrating an example of relationship between the second threshold and the speech production interval, which is set based on the pitch gain difference value in this embodiment. In FIG. 6, a horizontal axis represents time, and a vertical axis represents pitch gain. A waveform 600 represents a change of the pitch gain with time. In this example, at a time t1, the pitch gain becomes equal or greater than the first threshold Th1. Accordingly, at the time t1, the start of the speech production interval is detected. After that, it is given that, at a time t2, the speaker has terminated speech production. However, in this example, for a while following the time t2, the pitch gain keeps a fixed level. For this reason, as represented by a dotted line, when the threshold Th2 is too small, at the time t2, the end of the speech production interval is not detected, and at a time t3, it is determined that the speech production interval has terminated.

On the contrary, in this embodiment, the threshold Th2 is set based on a difference Δp between the average value of the noise pitch gain in the interval immediately preceding the start of the speech production interval and the maximum value of the pitch gain in the speech production interval. For this reason, the reduction amount of the second threshold Th2 from the first threshold Th1 becomes relatively small, resulting in that at the time t2, the pitch gain becomes smaller than the threshold Th2, to correctly detect the end of the speech production interval.

The speech production interval end detection section 29 outputs the timing at which the speech production interval has terminated to the processor 13.

When the start and the end of the speech production interval are detected, for example, to recognize contents of a speech produced by the speaker in the speech production interval, the processor 13 extracts a plurality of feature amounts representing features of speaker's voice from each frame in the speech production interval. For example, a predetermined degree of Mel-Frequency Cepstrum coefficient is used as the feature amount. The processor 13 applies the feature amounts in each frame to an acoustic hidden Markov model to recognize a phoneme group in the speech production interval. The processor 13 refers to a word dictionary indicating the phoneme group of each word to detect a combination of words that matches the phoneme group in the speech production interval, thereby recognizing speech contents in the speech production interval. Further, the processor 13 may execute the processing corresponding to the speech contents and an application performed by the processor 13. For example, the processor 13 applies automatic translation processing to the combination of words corresponding to the speech contents, to translate the speech contents into another language. The processor 13 may display a character string of the speech contents translated into another language on a display (not illustrated). Alternatively, the processor 13 may apply speech synthesis processing to the translated character string, and generate a synthesized audio signal representing the character string to reproduce the synthesized audio signal through a speaker (not illustrated). Alternatively, the processor 13 may use a combination of words corresponding to speech contents as a query, and execute search processing on a network connected to the speech production interval detection apparatus 1. Alternatively, the processor 13 may compare a character string representing speech contents with an operation command of equipment provided with the speech production interval detection apparatus 1, and when the character string representing the speech contents matches any operation command, execute processing corresponding to the operation command.

Figure 7:
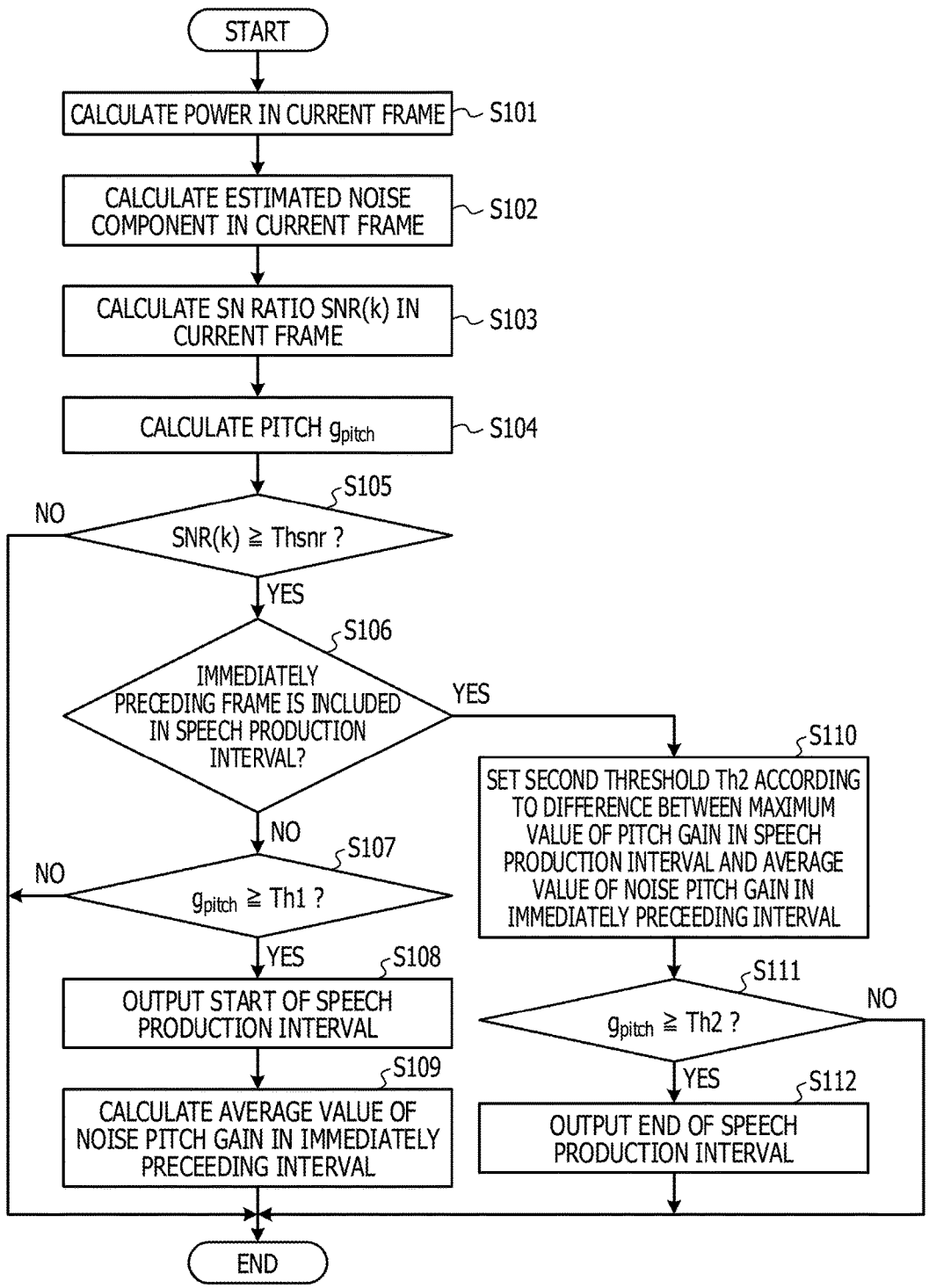
FIG. 7 is an operational flow chart of the speech production interval detection processing.

FIG. 7 is an operational flow chart of the speech production interval detection processing in this embodiment. The processor 13 executes the speech production interval detection processing for each frame according to the following operational flow chart.

The power calculation section 21 calculates power of the audio signal in the current frame (Step S101). The noise estimation section 22 calculates an estimated noise component in the current frame, based on power in the current frame and the estimated noise component in the immediately preceding frame (Step S102). The S/N ratio calculation section 23 calculates the SN ratio of the current frame SNR(k), based on power in the current frame and the estimated noise component (Step S103). Further, the pitch gain calculation section 25 calculates the pitch gain $g_{pitch}$ of the current frame (Step S104).

The sound determination section 24 determines whether or not the SN ratio of the current frame SNR(k) is equal or greater than the sound determination threshold Thsnr (Step S105). When the SN ratio of the current frame SNR(k) is smaller than the sound determination threshold Thsnr (No in Step S105), the sound determination section 24 determines that the current frame is not included in the sound interval. Then, the processor 13 terminates the speech production interval detection processing.

On the contrary, when the SN ratio of the current frame is equal or greater than the sound determination threshold Thsnr (Yes in Step S105), the sound determination section 24 determines that the current frame is included in the sound interval.

The speech production interval start detection section 26 determines whether or not the immediately preceding frame is included in the speech production interval (Step S106). When the immediately preceding frame is not included in the speech production interval (No in Step S106), the speech production interval start detection section 26 determines whether or not the pitch gain $g_{pitch}$ of the current frame is equal or greater than the relatively high first threshold Th1 (Step S107). When the pitch gain $g_{pitch}$ of the current frame is equal or greater than the first threshold Th1 (Yes in Step S107), the speech production interval start detection section 26 determines that the speech production interval has started from the current frame, and outputs information representing that the speech production interval has started (Step S108). The speech production interval start detection section 26 updates the flag indicating whether the frame is included in the speech production interval or non-speech production interval, to a value representing the speech production interval. The noise pitch gain calculation section 27 calculates the average value of the noise pitch gain in the interval immediately preceding the start of the speech production interval (Step S109).

On the contrary, when the pitch gain $g_{pitch}$ of the current frame is smaller than the first threshold Th1 (No in Step S107), the speech production interval start detection section 26 determines that the current frame is not included in the speech production interval. The processor 13 finishes the speech production interval start detection processing.

When the immediately preceding frame is included in the speech production interval in Step S106 (Yes in Step S106), the threshold setting section 28 sets the second threshold Th2 (Step S110). At this time, for example, the threshold setting section 28 sets the reduction amount of the second threshold Th2 from the first threshold Th1, based on the difference between the maximum value of the pitch gain in the speech production interval and the average value of the noise pitch gain in the interval immediately preceding the start of the speech production interval. The speech production interval end detection section 29 determines whether or not the pitch gain $g_{pitch}$ of the current frame is smaller than the second threshold Th2 (Step S111). When the pitch gain $g_{pitch}$ of the current frame is smaller than the second threshold Th2 (Yes in Step S111), the speech production interval end detection section 29 determines that the speech production interval has terminated in the immediately preceding frame, and outputs information representing that the speech production interval has terminated (Step S112). The speech production interval end detection section 29 updates the flag indicating whether the frame is included in the speech production interval or non-speech production interval, to a value representing the non-speech production interval.

On the contrary, when the pitch gain $g_{pitch}$ of the current frame is equal or greater than the second threshold Th2 (Step S111-No), the speech production interval end detection section 29 determines that the speech production interval continues also in the current frame. The processor 13 finishes the speech production interval detection processing. Until the start of the speech production interval is detected, when the average value of the noise pitch gain is updated for each frame by the equation (6), the processing in Step S109 may be executed between Steps S106 and S107.

As described above, in the speech production interval detection apparatus, the first threshold of the pitch gain, which is used to detect the start of the speech production interval, is set lower than the second threshold of the pitch gain, which is used to detect the end of the speech production interval. For this reason, even when the pitch gain decreases as a speech continues, the speech production interval detection apparatus is able to properly detect the speech production interval. The speech production interval detection apparatus adjusts the reduction amount of the second threshold from the first threshold, based on the difference between the average value of the noise pitch gain in the interval immediately preceding the start of the speech production interval and the maximum value of the pitch gain in the speech production interval. For this reason, even when the environment around the speaker is noisy, the speech production interval detection apparatus is able to properly detect the end of the speech production interval.

In the modification example, the pitch gain calculation section 25 may calculate the pitch gain for each frame in the sound interval, and may not calculate the pitch gain for each frame in the silence interval. This reduces the computation amount. In this case, when the interval immediately preceding the start of the speech production interval and the silence interval overlap each other, the noise pitch gain calculation section 27 may define the average value of the pitch gain in each frame contained in the immediately preceding interval other than the silence interval, as the average value of the noise pitch gain. Alternatively, the noise pitch gain calculation section 27 may use a predetermined value (for example, 0) as the pitch gain in each frame included in both of the interval immediately preceding the start of the speech production interval and the silence interval, and calculate the average value of the noise pitch gain.

In another modification example, the noise pitch gain calculation section 27 may calculate a central value or a modal value of the noise pitch gain in the interval immediately preceding the speech production interval, as the representative value of the noise pitch gain in the interval immediately preceding the speech production interval. The threshold setting section 28 may calculate a maximum value of the smoothed pitch gain in each frame in the speech production interval, which is acquired by smoothing filtering processing, as the representative value of the pitch gain in the speech production interval, which is used to set the second threshold. Alternatively, the threshold setting section 28 may calculate the average value of the pitch gain in a few frames immediately following the start of the speech production interval, as the representative value of the pitch gain in the speech production interval, which is used to set the second threshold. Even when these values are used, the threshold setting section 28 is able to properly set the reduction amount of the second threshold from the first threshold.

In still another modification example, the threshold setting section 28 may adjust the second threshold Th2, based on the pitch gain at the start of the speech production interval. For example, as represented by a following equation, the threshold setting section 28 may calculate the second threshold Th2 by using, in place of the first threshold Th1 in the equation (8), a value acquired by multiplying a ratio of the pitch gain $g_{pitch}(t_{start})$ at the start of the speech production interval to a reference value $g_{ref}$ of the pitch gain by the first threshold Th1. That is, as the pitch gain at the start of the speech production interval is larger, the second threshold Th2 becomes larger. As in the above-mentioned embodiment, the coefficient a may be set larger as the pitch gain difference value is larger.

$$Th2 = \frac{g_{pitch}(t_{start})}{g_{ref}} \cdot Th1 - a \cdot D \quad (9)$$

Also in this case, the speech production interval end detection section 29 may determine that the speech production interval has terminated when the pitch gain becomes smaller than the second threshold Th2.

In this modification example, since the second threshold is adjusted based on the pitch gain at the start of the speech production interval, the speech production interval end detection section 29 is able to properly adjust the second threshold according to the feature of speaker's voice. As a result, the speech production interval end detection section 29 is able to detect the end of the speech production interval more properly.

In the equation (9), the threshold setting section 28 may use the maximum value of the pitch gain in the speech production interval in place of the pitch gain $g_{pitch}(t_{start})$ at the start of the speech production interval.

In another modification example, the speech production interval start detection section 26 may adjust the first threshold Th1 based on the SN ratio of the audio signal. Similarly, the threshold setting section 28 may adjust the second threshold Th2 based on the SN ratio of the audio signal.

Generally, since the ratio of the noise component contained in the audio signal is higher as the SN ratio is lower, the periodicity of the audio signal lowers. Thus, in this modification example, the speech production interval start detection section 26 sets the first threshold Th1 lower as the SN ratio of the current frame is lower.

Figure 8:
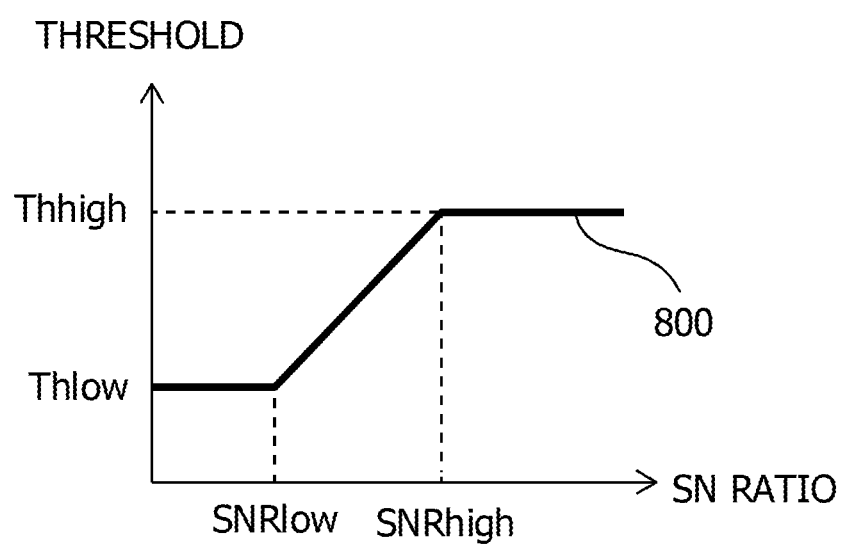
FIG. 8 is a view illustrating an example of relationship between an SN ratio and a first threshold.

FIG. 8 is a view illustrating an example of relationship between the SN ratio and the first threshold Th1. In FIG. 8, a horizontal axis represents the SN ratio, and a vertical axis represents the first threshold Th1. A broken line 800 represents relationship between the SN ratio and the first threshold Th1. As represented by the broken line 800, when the SN ratio is equal to or smaller than SNRlow, the first threshold Th1 is set to Thlow. When the SN ratio is larger than SNRlow and is smaller than SNRhigh, the first threshold Th1 linearly increases as the SN ratio is larger. When the SN ratio is equal to or greater than SNRhigh, the first threshold Th1 is set to Thhigh. SNRlow and SNRhigh are set to, for example, 18 dB and 30 dB, respectively. Thlow and Thhigh are set to, for example, 0.5 and 0.7, respectively. As illustrated in FIG. 8, a reference table representing relationship between the SN ratio and the first threshold Th1 is previously stored in the memory 14, and the speech production interval start detection section 26 may refer to the reference table, and set the first threshold Th1 corresponding to the SN ratio.

Further, the threshold setting section 28 may calculate the second threshold Th2 by substituting the first threshold Th1 determined based on the SN ratio into the equation (8) or (9). As a result, when the SN ratio is larger than SNRlow and is smaller than SNRhigh, the second threshold Th2 linearly increases as the SN ratio is larger.

In this modification example, the speech production interval start detection section 26 is able to determine the first threshold Th1 according to the SN ratio of the audio signal. Similarly, the threshold setting section 28 is able to properly determine the second threshold Th2 according to the SN ratio of the audio signal. To suppress the first and second thresholds of the pitch gain from rapidly changing, the speech production interval start detection section 26 may determine the first threshold Th1 based on the SN ratio in the frame at the start of the sound interval, according to the relationship illustrated in FIG. 8.

The adjustment of the first threshold based on the SN ratio may be combined with the adjustment of the second threshold base on the pitch gain. In this case, the threshold setting section 28 may calculate the second threshold Th2 by defining the first threshold based on the SN ratio as the first threshold Th1 in the equation (9).

In the noisy environment, an error of the calculated pitch gain may become relatively large due to noise. For this reason, even when the speech production interval is not terminated, the pitch gain may become spontaneously smaller than the second threshold.

In still another modification example, after the start of the speech production interval, when the state where the pitch gain is smaller than the second threshold Th2 continues for a fixed monitor interval, the speech production interval end detection section 29 may determine that the speech production interval has terminated. According to an Inventor's experiment, in a less noisy environment (for example, the SN ratio is 30 dB), the value of the pitch gain was continuously 0.6 or more in the speech production interval. On the contrary, the pitch gain did not continue for 1 second or more in the non-speech production interval. Thus, the monitor interval is set to, for example, 1 second.

Figure 9:
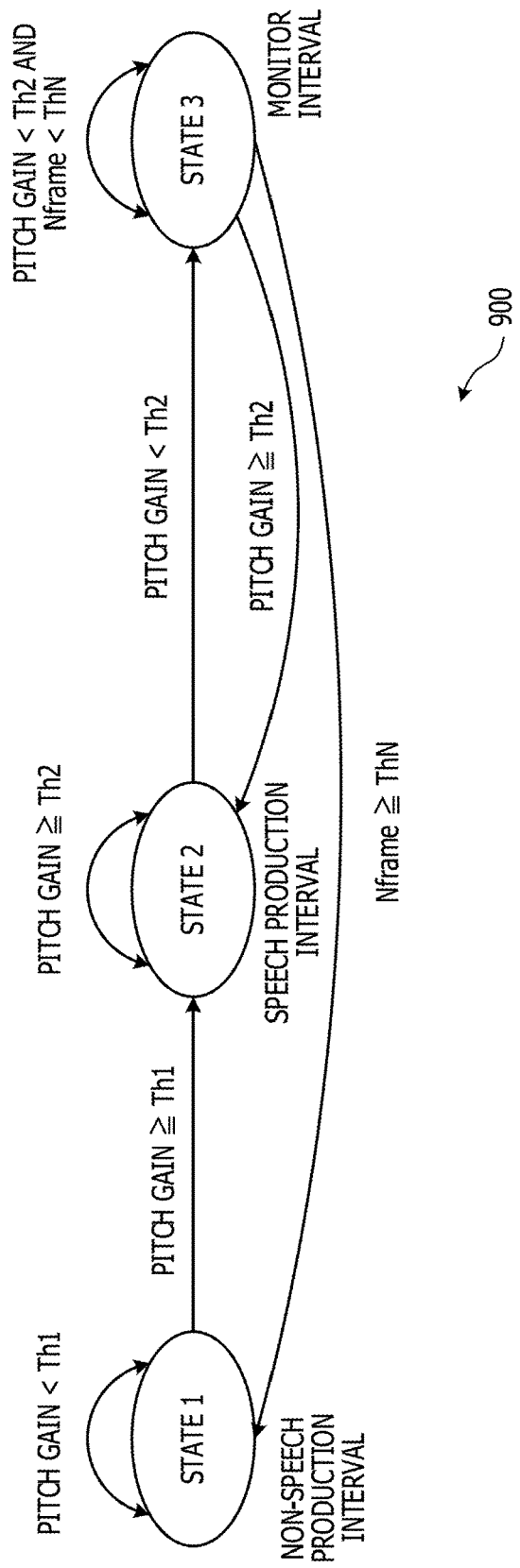
FIG. 9 is a state transition view illustrating determination of the speech production interval in a modification example.

FIG. 9 is a state transition view illustrating determination of the speech production interval in this modification example. In a state transition view 900, a state 1 to a state 3 are different detection states in the speech production interval. Specifically, in the state 1, the immediately preceding frame is not in the speech production interval and the monitor interval, that is, in the non-speech production interval. In the state 2, the immediately preceding frame is in the speech production interval. In the state 3, the immediately preceding frame is in the monitor interval.

In the state 1, when the pitch gain in the current frame is smaller than the first threshold Th1, the detection state in the speech production interval does not change. That is, the current frame is included in the non-speech production interval. On the contrary, in the state 1, when the pitch gain in the current frame is equal or greater than the first threshold Th1, the detection state in the speech production interval transitions from the state 1 to the state 2. That is, the speech production interval starts from the current frame.

In the state 2, when the pitch gain in the current frame is equal or greater than the second threshold Th2 that is lower than the first threshold Th1, the detection state in the speech production interval does not change. That is, the current frame is included in the speech production interval. On the contrary, in the state 2, when the pitch gain in the current frame is smaller than the second threshold Th2, the detection state in the speech production interval transitions from the state 2 to the state 3. That is, the monitor interval starts from the current frame.

In the state 3, when the pitch gain in the current frame becomes equal or greater than the second threshold Th2, the detection state in the speech production interval transitions from the state 3 to the state 2. That is, it is determined that the speech production interval continues to the current frame, and the monitor interval is terminated once. On the contrary, when the pitch gain in the current frame is smaller than the second threshold Th2, and a duration from the start of the monitor interval (the number of frames corresponding to the duration is referred to as Nframe) does not reach a fixed period (threshold ThN), the detection state in the speech production interval does not change. That is, the current frame is included in the monitor interval. When the pitch gain in the current frame is smaller than the second threshold Th2, and the duration from the start of the monitor interval reaches the fixed period, the detection state in the speech production interval transitions from the state 3 to the state 1. That is, it is determined that the speech production interval has terminated in the current frame.

Figure 10:
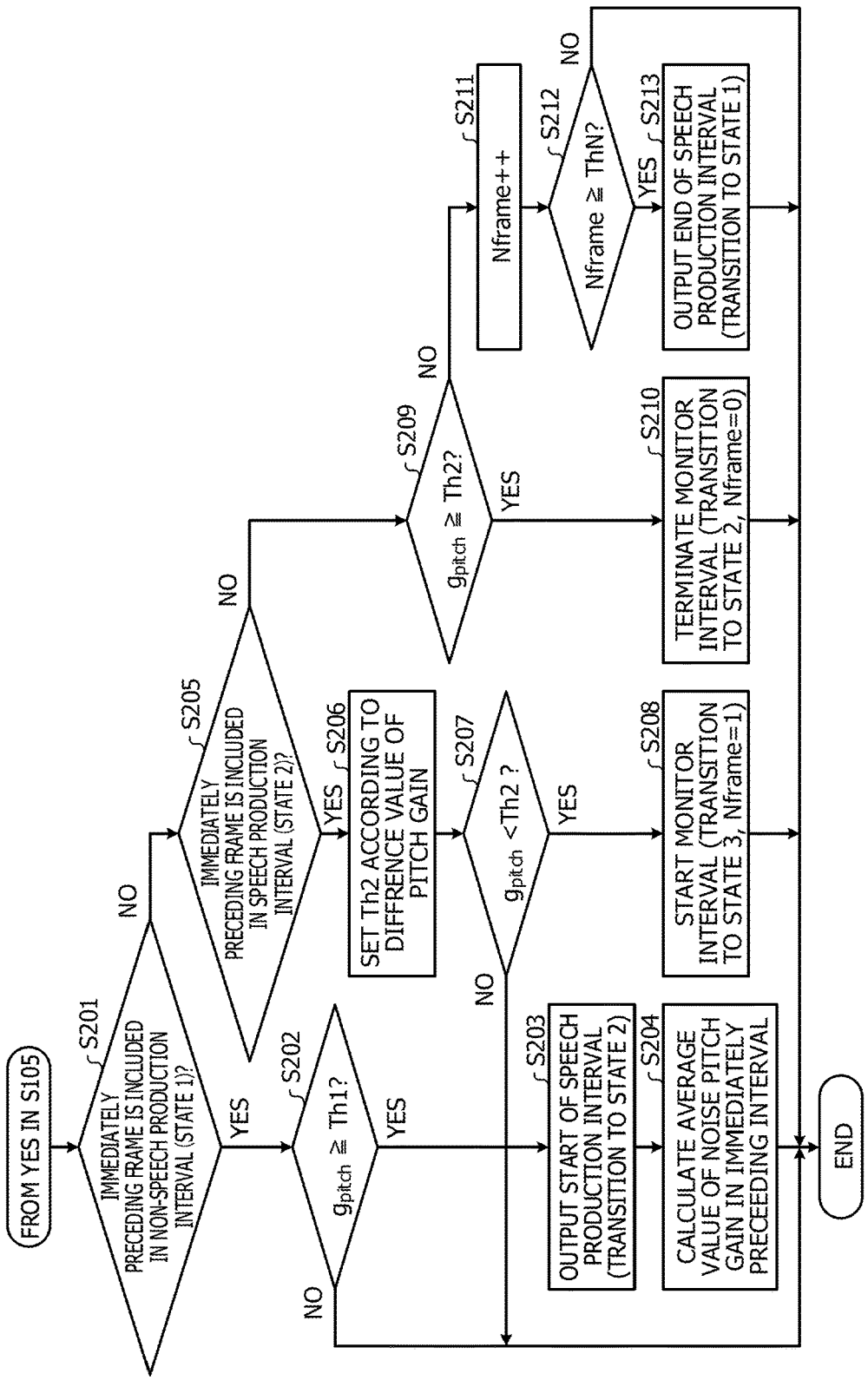
FIG. 10 is an operational flow chart of speech production interval detection processing in a modification example.

FIG. 10 is an operational flow chart of the speech production interval detection processing in this modification example. Since the speech production interval detection processing in this modification example is the same as the speech production interval detection processing in the above-mentioned embodiment in FIG. 7 until the interval is determined as the sound interval in Step S105 (that is, Yes in Step S105), processing in steps following Step S105 will be described with reference to FIG. 10.

The speech production interval start detection section 26 determines whether or not the immediately preceding frame is included in the non-speech production interval (Step S201). That is, the speech production interval start detection section 26 determines whether or not the detection state in the immediately preceding frame in the speech production interval is the state 1. When the immediately preceding frame is included in the non-speech production interval (Yes in Step S201), the speech production interval start detection section 26 determines whether or not the pitch gain $g_{pitch}$ of the current frame is equal or greater than the first threshold Th1 (Step S202). When the pitch gain $g_{pitch}$ of the current frame is equal or greater than the first threshold Th1 (Yes in Step S202), the speech production interval start detection section 26 determines that the speech production interval has started from the current frame, and outputs information representing that the speech production interval has started (Step S203). That is, the detection state in the speech production interval transitions from the state 1 to the state 2. The noise pitch gain calculation section 27 calculates the average value of the noise pitch gain in the interval immediately preceding the start of the speech production interval (Step S204).

On the contrary, when the pitch gain $g_{pitch}$ of the current frame is smaller than the first threshold Th1 (No in Step S202), the speech production interval start detection section 26 determines that the current frame is not included in the speech production interval. That is, the detection state of the speech production interval is maintained to be the state 1. The processor 13 finishes the speech production interval detection processing.

When the immediately preceding frame is not included in the non-speech production interval in Step S201 (No in Step S201), the threshold setting section 28 determines whether or not the immediately preceding frame is included in the speech production interval (Step S205). That is, the threshold setting section 28 determines whether or not the detection state in the speech production interval in the immediately preceding frame is the state 2. When the immediately preceding frame is included in the speech production interval (Yes in Step S205), threshold setting section 28 sets the second threshold Th2, based on the pitch gain difference value (Step S206). The speech production interval end detection section 29 determines whether or not the pitch gain $g_{pitch}$ of the current frame is smaller than the second threshold Th2 (Step S207). When the pitch gain $g_{pitch}$ of the current frame is smaller than the second threshold Th2 (Yes in Step S207), the speech production interval end detection section 29 starts the monitor interval (Step S208). That is, the detection state in the speech production interval transitions from the state 2 to the state 3. The speech production interval end detection section 29 sets the number of frames Nframe from the start of the monitor interval, which represents the duration of the monitor interval, to 1. On the contrary, when the pitch gain $g_{pitch}$ of the current frame is equal or greater than the second threshold Th2 (No in Step S207), the speech production interval end detection section 29 determines that the speech production interval continues also in the current frame. That is, the detection state in the speech production interval keeps the state 2. The processor 13 finishes the speech production interval detection processing.

When the immediately preceding frame is not included in the speech production interval in Step S205 (No in Step S205), the monitor interval continues (state 3). In this case, the speech production interval end detection section 29 determines whether or not the pitch gain $g_{pitch}$ of the current frame is equal or greater than the second threshold Th2 (Step S209). When the pitch gain $g_{pitch}$ of the current frame is equal or greater than the second threshold Th2 (Yes in Step S209), the speech production interval end detection section 29 terminates the monitor interval (Step S210). That is, the detection state in the speech production interval transitions from the state 3 to the state 2. The speech production interval end detection section 29 resets Nframe to 0.

On the contrary, when the pitch gain $g_{pitch}$ of the current frame is smaller than the second threshold Th2 (No in Step S209), the speech production interval end detection section 29 increments Nframe by 1 (Step S211). The speech production interval end detection section 29 determines whether or not Nframe becomes equal or greater than the number of frames ThN, which represents the threshold of the length of the monitor interval (Step S212). For example, ThN is set to the number of frames corresponding to 1 second. When Nframe is equal or greater than ThN (Yes in Step S212), the speech production interval end detection section 29 determines that the speech production interval has terminated in the current frame, and outputs information representing the end of the speech production interval (Step S213). That is, the detection state in the speech production interval transitions from the state 3 to the state 1. In this case, the speech production interval end detection section 29 may determine that the speech production interval has terminated at the start of the monitor interval.

On the contrary, when Nframe is smaller than ThN (No in Step S212), the speech production interval end detection section 29 determines that the monitor interval continues also in the current frame. That is, the detection state in the speech production interval keeps the state 3. The processor 13 finishes the speech production interval detection processing.

In this modification example, even when an error of the pitch gain becomes large due to the noise component in the audio signal, the speech production interval end detection section 29 is able to properly detect the timing at which the speech production interval has terminated.

In still another modification example, the pitch gain calculation section 25 may calculate the pitch gain based on long-term autocorrelation of a residual signal with respect to a linear prediction component of the audio signal. The long-term autocorrelation of the residual signal represents remaining autocorrelation with a short-term correlation component being removed from the audio signal. In this case, the pitch gain calculation section 25 calculates a linear prediction coefficient of the audio signal. At this time, the pitch gain calculation section 25 may calculate the linear prediction coefficient, for example, according to a method prescribed in the TTC Standard JT-G722.2, Chapter 5.2.2. The pitch gain calculation section 25 calculates the residual signal res(n) by a following equation.

$$res(n) = s_k(n) + \sum_{i=1}^{p} a(i) \cdot s_k(n-i) \ (n = 0, 1, \ldots, N-1) \quad (10)$$

Wherein, a(i) represents the linear prediction coefficient, and p represents the degree of the linear prediction coefficient (for example, 16).

The pitch gain calculation section 25 calculates a long-term autocorrelation $C_{res}(d)$ of the residual signal by a following equation.

$$C_{res}(d) = \sum_{n=0}^{N-1} res(n) \cdot res(n-d) \ (d = d_{low}, \ldots, d_{high}) \quad (11)$$

As in the equation (4) in the above-mentioned embodiment, a minimum value $d_{low}$ and a maximum value $d_{high}$ of the delay amount d are set to include the delay amount corresponding to the fundamental frequency of human voice.

When calculating the long-term autocorrelation $C_{res}(d)$ of the residual signal for each delay amount d included in the delay amount range, the pitch gain calculation section 25 finds the maximum value $C_{res}(d_{max})$ of the long-term autocorrelation $C_{res}(d)$. dmax is a delay amount corresponding to the maximum value $C_{res}(d_{max})$ of the long-term autocorrelation $C_{res}(d)$, and the delay amount corresponds to the pitch cycle. The pitch gain calculation section 25 may calculate the pitch gain $g_{pitch}$ according to a following equation.

$$g_{pitch} = \frac{C_{res}(d_{max})}{\sum_{n=0}^{N-1} res(n) \cdot res(n)} \quad (12)$$

In the above embodiment or the modification example, the speech production interval detection apparatus 1 may directly detect the speech production interval from the audio signal without detecting the sound interval. That is, irrespective of the sound interval or not, the speech production interval start detection section 26 may detect the start of the speech production interval, based on a comparison result of the pitch gain and the first threshold Th1.

Although this is able to slightly lower the accuracy of detecting the speech production interval, the computation amount requested to detect the speech production interval is reduced. In this case, among the sections of the processor 13, the sound determination section 24 may be omitted. When the SN ratio is not used to adjust the first threshold Th1 and the second threshold Th2, the power calculation section 21, the noise estimation section 22, and the S/N ratio calculation section 23 may be also omitted.

The speech production interval detection apparatus in any of the above embodiment and modification examples may be implemented in a server client system.

FIG. 11 is a schematic configuration view of a server client system equipped with the speech production interval detection apparatus in any of the above embodiment and modification examples.

A server client system 100 has a terminal 110 and a server 120, and the terminal 110 are able to communicate with the server 120 via a communication network 130. The server client system 100 may include the plurality of terminals 110. Similarly, the server client system 100 may include the plurality of servers 120.

The terminal 110 has a microphone 111, a memory 112, a communication interface 113, and a processor 114. The microphone 111, the memory 112, and the communication interface 113 are connected to the processor 114 via a bus.

The microphone 111 is an example of a sound input section, which acquires an audio signal as an analog signal, and samples the audio signal at a predetermined sampling rate, digitizing the audio signal. The microphone 111 outputs the digitized audio signal to the processor 114.

The memory 112 has, for example, a non-volatile semiconductor memory and a volatile semiconductor memory. The memory 112 stores a computer program for controlling the terminal 110, identification information on the terminal 110, and various data and a computer program used in the speech production interval detection processing.

The communication interface 113 has an interface circuit for connecting the terminal 110 to the communication network 130. The communication interface 113 transmits the audio signal received from the processor 114 along with the identification information on the terminal 110 to the server 120 via the communication network 130.

The processor 114 has a CPU and its peripheral circuit. The processor 114 transmits the audio signal along with the identification information on the terminal 110 to the server 120 via the communication interface 113 and the communication network 130. The processor 114 receives a processing result of the audio signal from the server 120, and displays the result on a display (not illustrated), or reproduces a synthesized audio signal corresponding to the processing result via a speaker (not illustrated).

The server 120 has a communication interface 121, a memory 122, and a processor 123. The communication interface 121 and the memory 122 are connected to a processor 123 via a bus.

The communication interface 121 has an interface circuit for connecting the server 120 to the communication network 130. The communication interface 121 transmits the audio signal and the identification information on the terminal 110 to the processor 123 via the communication network 130 from the terminal 110.

The memory 122 has, for example, a non-volatile semiconductor memory and volatile semiconductor memory. The memory 122 stores a computer program for controlling the server 120. The memory 122 may store a computer program for executing the speech production interval detection processing, and an audio signal received from each terminal.

The processor 123 has a CPU and its peripheral circuit. The processor 123 realizes each function of the processor in the speech production interval detection apparatus in any of the above embodiment and modification examples. Further, the processor 123 applies predetermined processing such as sound recognition to the detected speech production interval to find a processing result. The processor 123 transmits the processing result to the terminal 110 via the communication interface 121 and the communication network 130.

A computer program that causes a computer to realize each function of the processor in the speech production interval detection apparatus in any of the above embodiment and modification examples may be recorded in a computer-readable medium such as a magnetic recording medium or an optic recording medium.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An apparatus for detecting speech production interval, the apparatus comprising:
   a memory; and
   a processor coupled to the memory and configured to
      execute pitch gain calculation processing that includes calculating a pitch gain indicating a magnitude of periodicity of an audio signal for each frame, the audio signal representing speaker's voice to be divided into the frames each having a predetermined length,
      execute speech production interval start detection processing that includes determining that a speech production interval in which the speaker produces a speech has started, when the pitch gain becomes equal or greater than a first threshold after a non-speech production interval in which the speaker is not producing a speech,
      execute threshold setting processing that includes setting a second threshold that is lower than the first threshold by a reduction amount corresponding to a value acquired by subtracting a second representative value of the pitch gain in an interval preceding the start of the speech production interval from a first representative value of the pitch gain in the speech production interval, and
      execute speech production interval end detection processing that includes determining that the speech production interval has terminated, when the pitch gain becomes smaller than the second threshold after the speech production interval has started.

2. The apparatus according to claim 1, wherein the threshold setting processing is configured to calculate a maximum value of the pitch gain in the speech production interval as the first representative value.

3. The apparatus according to claim 1, wherein the processor is further configured to execute noise pitch gain calculation processing that includes calculating an average value of the pitch gain in an interval preceding the start of the speech production interval as the second representative value.

4. The apparatus according to claim 1, wherein the threshold setting processing is configured to increase the second threshold, as the pitch gain in the frame in which the speech production interval has started is larger.

5. A method for detecting speech production interval, the method comprising:
   executing, performed by processor circuitry, pitch gain calculation processing that includes calculating a pitch gain indicating a magnitude of periodicity of an audio signal for each frame, the audio signal representing speaker's voice to be divided into the frames each having a predetermined length;
   executing, performed by the processor circuitry, speech production interval start detection processing that includes determining that a speech production interval in which the speaker produces a speech has started, when the pitch gain becomes equal or greater than a first threshold after a non-speech production interval in which the speaker is not producing a speech;

executing, performed by the processor circuitry, threshold setting processing that includes setting a second threshold that is lower than the first threshold by a reduction amount corresponding to a value acquired by subtracting a second representative value of the pitch gain in an interval preceding the start of the speech production interval from a first representative value of the pitch gain in the speech production interval; and executing, performed by the processor circuitry, speech production interval end detection processing that includes determining that the speech production interval has terminated, when the pitch gain becomes smaller than the second threshold after the speech production interval has started.

6. The method according to claim 5, wherein the threshold setting processing is configured to calculate a maximum value of the pitch gain in the speech production interval as the first representative value.

7. The method according to claim 5, the method further comprising:

executing noise pitch gain calculation processing that includes calculating an average value of the pitch gain in an interval preceding the start of the speech production interval as the second representative value.

8. The method according to claim 5, wherein the threshold setting processing is configured to increase the second threshold, as the pitch gain in the frame in which the speech production interval has started is larger.

9. A non-transitory computer-readable storage medium for storing a speech production interval detection computer program that causes a processor to perform a process, the process comprising:

executing pitch gain calculation processing that includes calculating a pitch gain indicating a magnitude of periodicity of an audio signal for each frame, the audio signal representing speaker's voice to be divided into the frames each having a predetermined length;

executing speech production interval start detection processing that includes determining that a speech production interval in which the speaker produces a speech has started, when the pitch gain becomes equal or greater than a first threshold after a non-speech production interval in which the speaker is not producing a speech;

executing threshold setting processing that includes setting a second threshold that is lower than the first threshold by a reduction amount corresponding to a value acquired by subtracting a second representative value of the pitch gain in an interval preceding the start of the speech production interval from a first representative value of the pitch gain in the speech production interval; and executing speech production interval end detection processing that includes determining that the speech production interval has terminated, when the pitch gain becomes smaller than the second threshold after the speech production interval has started.

10. The non-transitory computer-readable storage medium according to claim 9, wherein the threshold setting processing is configured to calculate a maximum value of the pitch gain in the speech production interval as the first representative value.

11. The non-transitory computer-readable storage medium according to claim 9, wherein the process further comprising: executing noise pitch gain calculation processing that includes calculating an average value of the pitch gain in an interval preceding the start of the speech production interval as the second representative value.

12. The non-transitory computer-readable storage medium according to claim 1, wherein the threshold setting processing is configured to increase the second threshold, as the pitch gain in the frame in which the speech production interval has started is larger.

* * * * *